(12) United States Patent
Knight (10) Patent No.: US 7,219,236 B2
(45) Date of Patent: May 15, 2007

(54) ADMINISTERING A SECURITY SYSTEM

(75) Inventor: Erik A. Knight, Dallas, TX (US)

(73) Assignee: Electronic Data Systems Corporation, Plano, TX (US)

( * ) Notice: Subject to any disclaimer, the term of this patent is extended or adjusted under 35 U.S.C. 154(b) by 844 days.

(21) Appl. No.: 10/373,189

(22) Filed: Feb. 26, 2003

(65) Prior Publication Data

US 2004/0168069 A1    Aug. 26, 2004

(51) Int. Cl.
    *H04L 9/32* (2006.01)
(52) U.S. Cl. .................. 713/186; 713/182
(58) Field of Classification Search .............. 902/3; 713/186, 182
    See application file for complete search history.

(56) References Cited

U.S. PATENT DOCUMENTS

| 6,202,151 | B1 * | 3/2001  | Musgrave et al. .......... 713/186 |
| 6,351,695 | B1   | 2/2002  | Weiss |
| 6,470,448 | B1 * | 10/2002 | Kuroda et al. ............. 713/176 |
| 6,587,945 | B1 * | 7/2003  | Pasieka .................... 713/176 |
| 6,959,382 | B1 * | 10/2005 | Kinnis et al. ............... 713/170 |
| 6,993,659 | B2 * | 1/2006  | Milgramm et al. ......... 713/186 |
| 7,069,444 | B2 * | 6/2006  | Lowensohn et al. ........ 713/185 |
| 2002/0030584 | A1 | 3/2002 | Perler et al. |
| 2002/0133725 | A1 | 9/2002 | Roy et al. |
| 2002/0188574 | A1 * | 12/2002 | Niwa ....................... 705/64 |

FOREIGN PATENT DOCUMENTS

| EP | 1 170 705    | 1/2002  |
| WO | WO 98/50875  | 11/1998 |
| WO | WO 00/07330  | 2/2000  |
| WO | WO 00/08541  | 2/2000  |

OTHER PUBLICATIONS

Ploeg, Irma, "Written in the Body: Biometrics and Identity", Mar. 1999, Computers and Society. pp. 37-44.*
Steinauer et al., "Trust and Traceability in Electronic Commerce", Sep. 1997, StandardView, vol. 5, No. 3, pp. 118-124.*
Lipton et al., "Modern Trends in Authentication", 1985, ACM Press, pp. 36-42.*
International Search Report, PCT/US2004/005778, dated Jul. 15, 2004.

* cited by examiner

*Primary Examiner*—Matthew Smithers
(74) *Attorney, Agent, or Firm*—Fish & Richardson P.C.

(57) ABSTRACT

A security system may be administered by interrogating a first user using a first security system that generates a user data set related to the first user's physiological characteristics. An access code may be determined based on the user data set. A range of activities may be enabled in accordance with the access code. A document related to the user action may be accessed so that a digital certificate may be embedded in the document using the user data set.

38 Claims, 5 Drawing Sheets

ADMINISTERING A SECURITY SYSTEM

TECHNICAL FIELD

This document relates to access control.

BACKGROUND

Biometric security systems measure a user's physiological characteristics to confirm the identity of a user. Biometric sensors that may be used include facial recognition systems, fingerprint identification systems, retinal scanning systems, and voiceprint identification systems. Because the biometric sensors actually measure a physical characteristic, they may be deemed more secure in that they require the user to actually possess the physical characteristic, rather than merely to know something, as is the case with passwords. Also, a security system that uses physiological characteristics of a user may be considered by some to be a more difficult system to defeat.

SUMMARY

In one general aspect, a security system may be administered by interrogating a first user using a first security system that generates a user data set related to at least one of the first user's physiological characteristics. An access code is determined based on the user data set, and a first user action is enabled in accordance with the access code. Finally, a document related to the first user action is accessed, and a digital certificate that uses the user data set may be embedded in the document.

Implementations may include one or more of the following features. For example, a message may be forwarded with the document to a reviewing authority for approval. The reviewing authority may be interrogated using a second security system that generates a reviewing data set related to at least one of the reviewing authority's physiological characteristics. A reviewing code based on the reviewing data set may be determined to enable a transaction for the first user action when the reviewing code allows the reviewing authority to approve the transaction. A document related to the first user action may be accessed so as to embed a reviewing certificate in the document using the reviewing data set.

The first user action may include accessing a geographically-restricted area secured by the first security system. The document may include a manifest log recording which users have accessed the physically-restricted area.

Determining an access code may include determining that the first user has initial permission to begin preliminary activities that are part of a larger task. An approval of a reviewing authority may be required before the larger task may be completed.

The document may separately archive the digital certificate and a description of the user action in different locations.

The digital certificate may include the user data set or the result of a logical operation on the user data set. Enabling the first user action may include providing the first user with apparent access while activating an alarm.

One or more actions of the first user may be tracked. A digital certificate may be embedded in the document when the document is subsequently accessed.

Implementations may include a system or program capable of achieving the above features, including, for example, a terminal or a host.

The details of particular implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

To combat fraud in critical transactions, an enterprise employs security procedures to address the risk that a particular transaction may be unauthorized. For example, a purchasing department may only want authorized persons to create purchase orders. The task of the security system may become more difficult in electronic commerce systems when procedures are streamlined and personal interaction is reduced. Electronic and biometric security procedures that address the risk can be incorporated into the transaction procedures. For example, a user may be interrogated using a biometric security system and the results may be compared with a security database to generate an access code that determines the user's permissions to engage in a range of activities.

The user then may be allowed to engage in the requested and other allowable activities. The range of allowable activities may depend on the context in which the security system is used. For example, in a transaction processing system, the user may be allowed to generate an electronic purchase order. In a physical security system, the user may be allowed to enter a restricted area. In any event, independent of the underlying activity, a document is accessed that describes the user activity. The document itself may be the focus of the user activity. For example, the document may include an electronic purchase order that the user wishes to execute. In another case, the document may include an airline passenger manifest list for a flight. Regardless of whether the user accesses the document itself, or whether the document captures the user's activity, the security system embeds in the document a digital certificate using the user's biometrics. For example, in an electronic purchase order, a certificate based on the user's fingerprint may be digitally embedded in the document. In the passenger manifest list, the facial biometrics of all those who enter the plane may be recorded in association with entries describing those who enter the plane.

Figure 1:
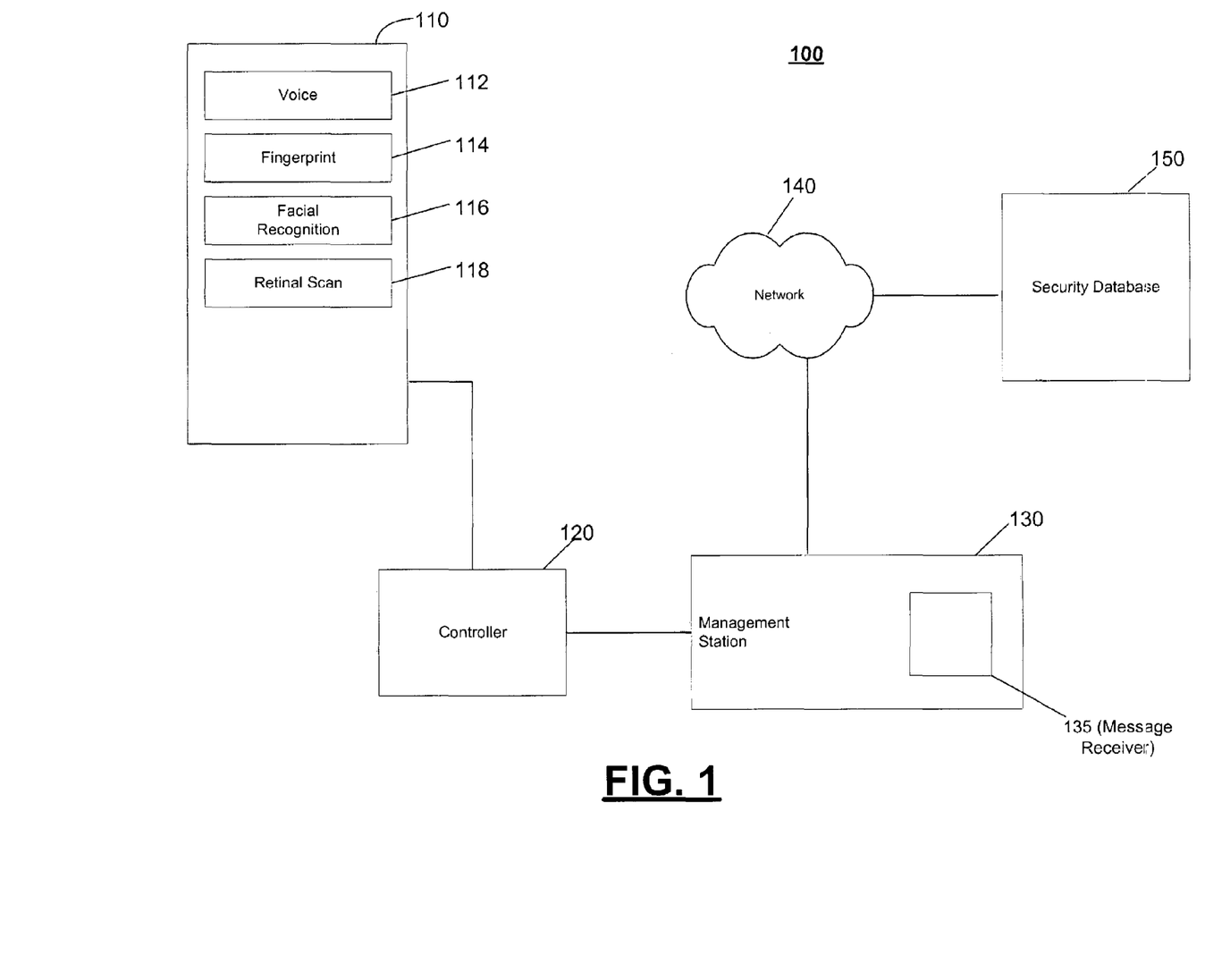
FIG. 1 is a block diagram of a communications system.

FIG. 1 illustrates a communications system 100 configured to enable a management station 130 to administer a security system 110 using the security database 150. Communications system 100 includes a security system 110, a controller 120, a management station 130, a network 140, and a security database 150. Generally, the security system 110, which may include one or more biometric authentication systems, interfaces with a controller 120 to be managed by the management station 130. The management station 130 then may take a user data set received from the security system 110 and interface with the security database to generate security conditions, messages, and alerts to control the security system based on updates and information from the security database 150.

The security system 110 may include one or more security tools used to identify a user who is interfacing with the security system. Typically, this may include a biometric system configured to read user biometric data and generate a user data set to identify and/or authenticate the user who is interfacing with the security system 110. Examples of the security tools that may be included in the security system 110 may include, but are not limited to, a voice print identification system 112, a fingerprint identification system 114, a facial recognition system 116, and a retinal scanner 118. Each of these biometric identification systems reads a user's biological data (e.g., a biometric parameter) and uses this data to identify and/or describe a user, where, ideally, each user's biometric parameter is sufficiently different and distinct from the biometric parameters for all other users. The ideal measurement is not always the case, as some user biometric data may be similar and/or not accurately read. Thus, in some cases, a user may be falsely identified as someone else or may not be identified.

The biometric security tools may include logic and/or hardware to interface with the user and receive the user's biometric data. For example, the voice print identification system 112 may include a microphone and logic that analyzes signals generated by the microphone. This logic may break down a user's voice print into time and/or frequency domains to categorize the voice. For example, a user may be asked to read a certain phrase into a microphone, and the user's voice may be sampled, digitized, and analyzed against a database of known voice prints residing, for example, in security database 150.

Similarly, the fingerprint identification system 114 may include an instrument configured to read the contours of a fingerprint through optical and/or electronic sensors. A facial recognition system 116 may read spatial and/or optical data configured to measure user's biometric data through features on the person's face. For example, the relative size of facial features (e.g., the height/width ratio of the nose) may be measured along with the distance between different points in a person's facial features. The distance between different portions of the eye, the distance between different structures in the face (e.g., the distance between different points in the cheek), and the size and/or measurements in a chin or jaw all are examples of features that may be measured. A retinal scanning system 118 may be used to determine a mapping for a user's retina that engages the retinal scanning system 118.

Generally, the controller 120 is configured to control the operation of the security system. For example, the sensors in a fingerprint identification system 114 may be reset per user. Similarly, the controller 120 may receive the dataset from one of the systems in the security system 110, perform some preliminary processing (e.g., perform some digital to analog conversion), and transmit the user data set to the management station 130. The controller 120 may be co-located with the security system 110, or the controller 120 may constitute a separate and distinct system from either the security system 110 and/or the management station 130. For example, the controller 120 may be configured to aggregate inputs from several fingerprint identification systems 114 that challenge users passing through an airport turnstile system. Alternatively, the controller 120 may include a program running in a management station 130.

The management station 130 includes a processing system configured to act as an intermediary between a security system 110 and a security database 150. Depending on the configuration of the communications system 100, the management station 130 may be distributed across one or more systems, or the management station 130 may be consolidated with other systems, such as, for example, the security system 110, the controller 120, and/or a security database 150. The management station 130 may be configured to receive a user dataset describing a user from a security system 110, and use a security database 150 to compare the user data set information against known information about certain users. In one configuration, the comparing may be performed on the management station 130. In another configuration, the comparing may be performed on the security database 150. Other examples may feature some preliminary comparisons that are performed on the management station 130, with unsuccessful comparisons forwarded to the security database 150 for subsequent processing.

In addition to receiving user datasets from a security system 110 and comparing the user dataset information with known security information residing in a security database 150, the management station also may be used to manage the configuration and settings of the security system 110. For example, the management station 130 may include a message receiver 135 configured to receive update messages from the security database 150 (e.g., a police alert system). In response to messages that are received, the management station 130 may adjust the configuration of the security system 110. For example, in response to an intelligence warning, the management station 130 may lower the thresholds for the security system 110 so that more possible identifications are generated. This lower threshold may require additional operator intervention and/or generate false positives because more users may be identified. This heightened sensitivity may be used to identify users that otherwise may not have been picked up but for the security alert that was received. When the heightened security concern passes, the security settings may return to a normal posture.

The network 140 includes one or more communications components configured to enable the management station 130 to exchange messages with the security database 150. The network 140 may include a direct link between the management station 130 and the security database 150, or it may include one or more networks or subnetworks between them (not explicitly shown). Each network or subnetwork may include, for example, a wired or wireless data pathway capable of carrying and receiving data. Examples of network 140 include the Internet, the World Wide Web, WANs ("Wide Area Networks"), LANs ("Local Area Networks"), analog or digital wired and wireless telephone networks (e.g., PSTN ("Public Switched Telephone Network"), ISDN ("Integrated Services Digital Network"), or xDSL ("any form of Digital Subscriber Loop")), radio, television, cable, satellite, and/or other delivery mechanisms for carrying data.

The security database 150 is an automated system configured to store user identification information and to act as a message exchanger for the management station 130. The security database 150 may include a controller configured to operate a computing device that provides an interface for the database. A controller is a software application loaded on the computing device for commanding and directing communications enabled by the computing device. Other examples include a program, a piece of code, an instruction, a device, a computer, a computer system, or a combination thereof, for independently or collectively instructing the computing device to interact and operate as described herein. The controller may be embodied permanently or temporarily in any type of machine, component, equipment, storage medium, or propagated signal capable of providing instructions to the computing device.

The security database 150 also may store user permissions. For example, an authenticated user may be allowed to engage in a particular range of activities. In the context of administering rights for a purchasing department, entry-level personnel may be allowed to engage in transactions up to a first limit, while mid-level personnel may be given a second limit. Still other transactions involving select items or a high value may be initiated by a first user but may require endorsement or approval by a second user before the purchase order may be executed.

In the context of physical security operations, the security database 150 may control which users are allowed into which areas. For example, only air traffic controllers may be allowed into the control tower of an airport. Similarly, only maintenance personnel may be allowed into maintenance areas, while law enforcement and security personnel may be allowed into multiple areas.

Although the security database 150 is illustrated as a separate and distinct system connected through the network 140, in one implementation, the security database 150 is incorporated into the management station 130. For example, the security database 150 may include a program running on the management station 130 that maintains a profile of user identities. Alternatively, the security database 150 may be distributed across one or more systems. Thus, a database may sort users by identity to access constituent attributes on one system while a second system may include users that are sorted by the users' attributes. In this manner, the database on the second system may be searched by referencing a class of fingerprints.

Figure 2:
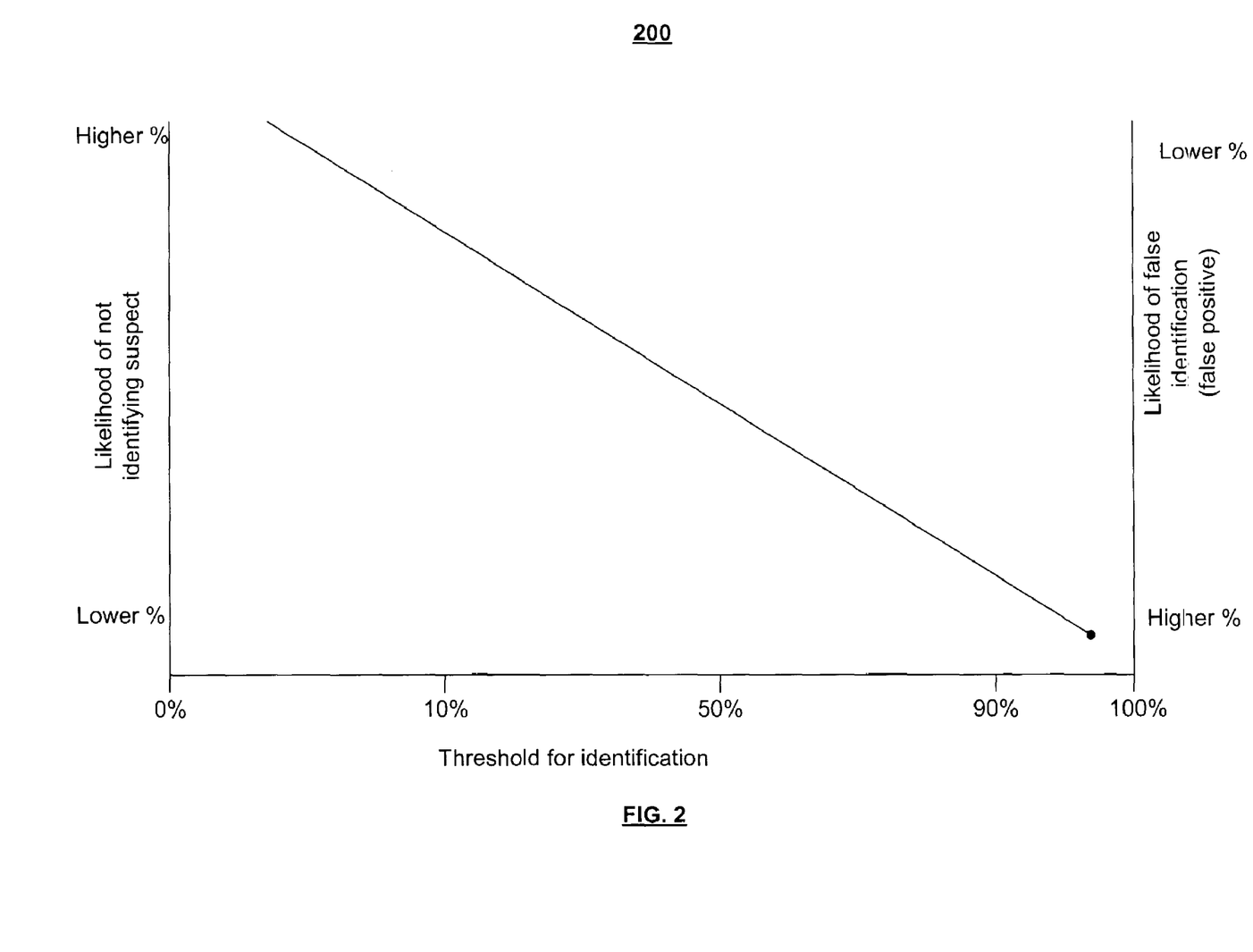
FIG. 2 is a graph that illustrates the likelihood of failing to identify a user versus the likelihood of falsely identifying a user.

Referring to FIG. 2, the flexibility and configuration of a biometric identification system is illustrated by a chart that plots the likelihood of a false positive relative to the possibility of an unsuccessful identification. Thus, as the likelihood of identifying a 'wanted' user decreases, the likelihood of a false positive similarly increases. Depending on the economics of identification and other systemic factors that are in place, various zones and modes of operation may be selected. If an administrator has other biometric systems that may be used to identify a user, the threshold may be set higher so that false positives may be reduced. Similarly, if the administrator has adequate security personnel available to perform an interrogation that may be required, the administrator also may set a higher threshold. In another context, the threshold may be lowered so as to reduce the number of help desk calls to follow up on erroneous user identification.

FIG. 2 represents an abstraction that is independent of the underlying identification, and there may be one or more intermediate steps that generate this general chart. For example, in a voice print identification system, a longer time span may be used to increase the likelihood of a successful match. Alternatively, in a fingerprint system, more data points may be identified from the fingerprint to generate the identification system. A facial recognition system 116 may use more facial measurements, and a retinal scanning system 118 may use a more detailed model of the retina.

Depending on the risk that the biometric system is configured to address, a management station 140 may alter the settings of the security system based on the predicted results shown in FIG. 2. For example, if a transaction system already uses other security measures to initially authenticate a user, the management station may reduce the threshold so that fewer alarms are generated when biometric systems are used to certify a transaction. In fact, the transaction system may capture the biometric data and incorporate the biometric data into a certificate embedded in the document. This biometric data may be used in forensic analysis to prevent an authorized user from improperly repudiating the transaction, or to confirm that an unauthorized user executed the transaction.

Figure 3:
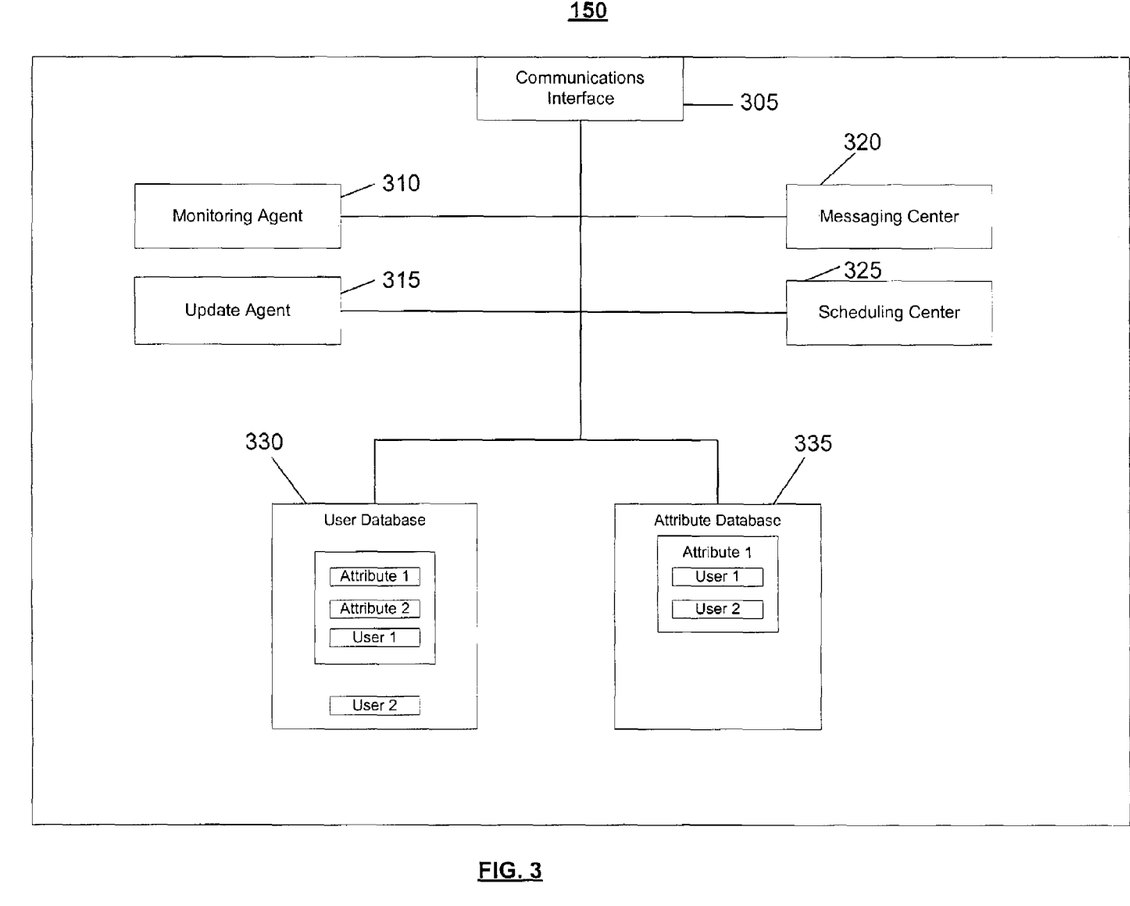
FIG. 3 is a block diagram of a security database.

FIG. 3 illustrates an exemplary security database 150 that may be used to interface with a management station 130. The security database 150 was generally described previously with respect to FIG. 1. However, the security database 150 shown in FIG. 3 illustrates the systems, programs, and components that may be incorporated into a security database.

The security database includes a communications interface 305 that provides an interface configured to exchange data with one or more automated systems using a network (e.g., network 140). As shown in FIG. 3, the communications interface 305 may exchange user datasets and information with a monitoring agent 310, an update agent, 315, a messaging center 320, a scheduling center 325, a user database 330, and/or an attribute database 335.

The monitoring agent 310 may include a code segment that maintains the state of one or more security systems that are being used. For example, the monitoring agent 310 may determine the overall utilization of a management station 130. If the management station 130 appears to be operating at or near capacity, the monitoring agent may work with other systems (e.g., the update agent 315) so that additional processing overhead maybe created for events that may arise. For example, the additional processing may be performed to better identify an initially suspect user. In another example, the monitoring agent 310 maintains a state based on the operations performed by the security system 110. For example, if a voice print identification system is not generating identifications, the lack of identifications may generate an update that modifies the security threshold used by the voice print identification system.

The update agent 315 may include a code segment configured to receive security updates from external systems (e.g., law enforcement authorities) and incorporate them into the databases within the security database 150. The update agent also may be configured to transmit updates to the security system 110 and/or the management station 130. To update the security system 110, the update agent 315 may adjust the threshold and criteria that are used to generate user databases and/or identification. An example of an update sent to the management station 130 may include providing a new suspect profile that may use additional processing resources to better identify a potential match with the newly received suspect profile.

Alternatively, the update agent 315 may be used to generate certificates to certify a transaction. For example, the update agent may retrieve keys (e.g., a private key in an asymmetric pair) from a certificate authority. These keys then may be used to operate on the user data from the biometric security system to embed a certificate in a document describing the user activity.

The messaging center 320 may include a message transmission system configured to exchange messages. Messages may be received from a central or higher ranking authority (e.g., a 'flash' messaging system) to receive critical policing data from a national authority. The messaging center 320 also may be used to distribute security updates to the management station 130, and may do so through, for example, the message receiver 135. In one example, the messaging center 320 includes an electronic mail application that receives and sends electronic mail messages to the different management stations. The electronic mail that is exchanged may include a MIME ("Multipurpose Internet Mail Extension") type. This MIME type may be read in an automated fashion to control the management station 130 and generate new settings for the security system 110.

The messaging center 320 may be used to forward messages to a reviewing authority to certify a transaction. For example, a user may generate a purchase order. The purchase order may require a supervisor to review the transaction before the transaction can be executed. In one example, the supervisor is interrogated by a biometric sensor to authorize the transaction. The supervisor's biometric information then may be embedded in the purchase order as a certificate to indicate that the transaction was authorized and to identify the person who authorized the transaction.

The scheduling center 325 may be used to change the configurations of the security systems 110. For example, to prevent unauthorized guesses aimed at defeating the security systems that are in place by enabling illicit planning against a known security system, the scheduling center 325 may periodically and/or randomly change the settings of the security system 110. This may include the selection of which security constituent components within a larger security system 110 are used. For example, during the course of a week, the voice print identification system 112 may be used on Monday morning, and a fingerprint identification system may be used on Monday afternoons. On Tuesday morning, a facial recognition system 116 may be used, and a retinal scanning system may be used on Tuesday afternoon. Alternatively, the scheduling center may schedule more than one security system to be used. Thus, a voice print identification system 112 may be used in conjunction with the facial recognition system 116.

The user database 330 includes a data store of information that may be used to identify a user based on the user's identity. A user may be associated with name and address information. One or more attributes may be referenced from the area that can be read by the authentication systems described in security system 110. For example, a user record may have a voiceprint, a fingerprint, a facial recognition, and retinal scanning information residing in a user record. The user record need not be limited to biometric data and need not include all the parameters described with respect to security system 110. For example, a user record may include or may be associated with a password used to identify the user. The password may be used in conjunction with biometric data. Alternatively, in the case of a criminal database, the biometric records may be incomplete. For example, for a first suspect, the biometric data may only include fingerprint information. In another example, the biometric data may be limited to facial recognition information.

The user database 330 also may store permissions that indicate a range of permissible activities. For example, access to a particular set of files may be restricted. The permissions need not include limits that are apparent to the user. For example, the permissions may include silent alarms that are activated while the user is given apparent access. A silent alarm may be forwarded to an appropriate official or administrator to take action. For example, a facial recognition system at an airport may initially scan all passengers that are dropped off at the departing location. A suspect may initially be allowed to proceed through the terminal to a checkpoint, where the suspect may be challenged by airport security.

The user database 330 also may store keys or other user information. For example, the security database 150 may be acting as a certificate server to certify that certain transactions are valid. The user information may be validated by the security database 150, and a key may be transmitted so that a certificate may be embedded in a document describing a user activity. The user database 330 also may store information that is commonly accessed by a user. For example, if the user is a purchasing agent, the user's purchase orders may be stored as a collection of documents in the user database 330. The information need not include information about which the user is aware. For example, the documents in the user database 330 may include information describing which portions of a building a user has accessed. When the user is challenged at a checkpoint, a biometric certificate may be embedded in a document describing the user's activities.

The attribute database 335 includes information that may be organized according to an attribute that may be read by a security system 110. For example, the presence and nature of markers within a fingerprint record may be used to sort, search, and compare users. This, in turn, may enable users to be identified by their fingerprints. Upon referencing a related fingerprint, the user record may be accessed. The attribute information need not be unique per user. For example, a particular feature appearing in a particular region of the fingerprint may identify several users. Subsequent processing either with respect to the fingerprint or other information may be used to better identify the user. Thus, once referencing a common element identifies the users, subsequent user information may be used to narrow down the identity of the current user being challenged.

The attributes that are stored need not be limited to the actual biometric measurements. Implementations of the attributes that are stored may include the result of logical operations that have been performed on the raw data. For example, the attributes may include the result of a hash operation that has been performed on the raw data. Another instance may include storing key reference points descriptive of the raw data.

Although the user database 330 and the attribute database 335 are shown as separate and distinct systems, the user database 330 and the attribute database 335 may be co-located and/or related to one another. For example, both databases may be implemented in one common database and searchable by various elements appearing in a field. For example, the database may be sorted and keyed (i.e., searchable) to user information and also keyed to user attribute information. Thus, the same database may be used either by referencing the user or by referencing a particular biometric value.

Although the security database is shown as one system in FIGS. 1 and 3, the security database 150 may be distributed across one or more systems. For example, different databases may store different records. A subset of information may be located in management stations at certain field sites. These management stations may reference a national database to receive sensitive and/or larger datasets.

Figure 4:
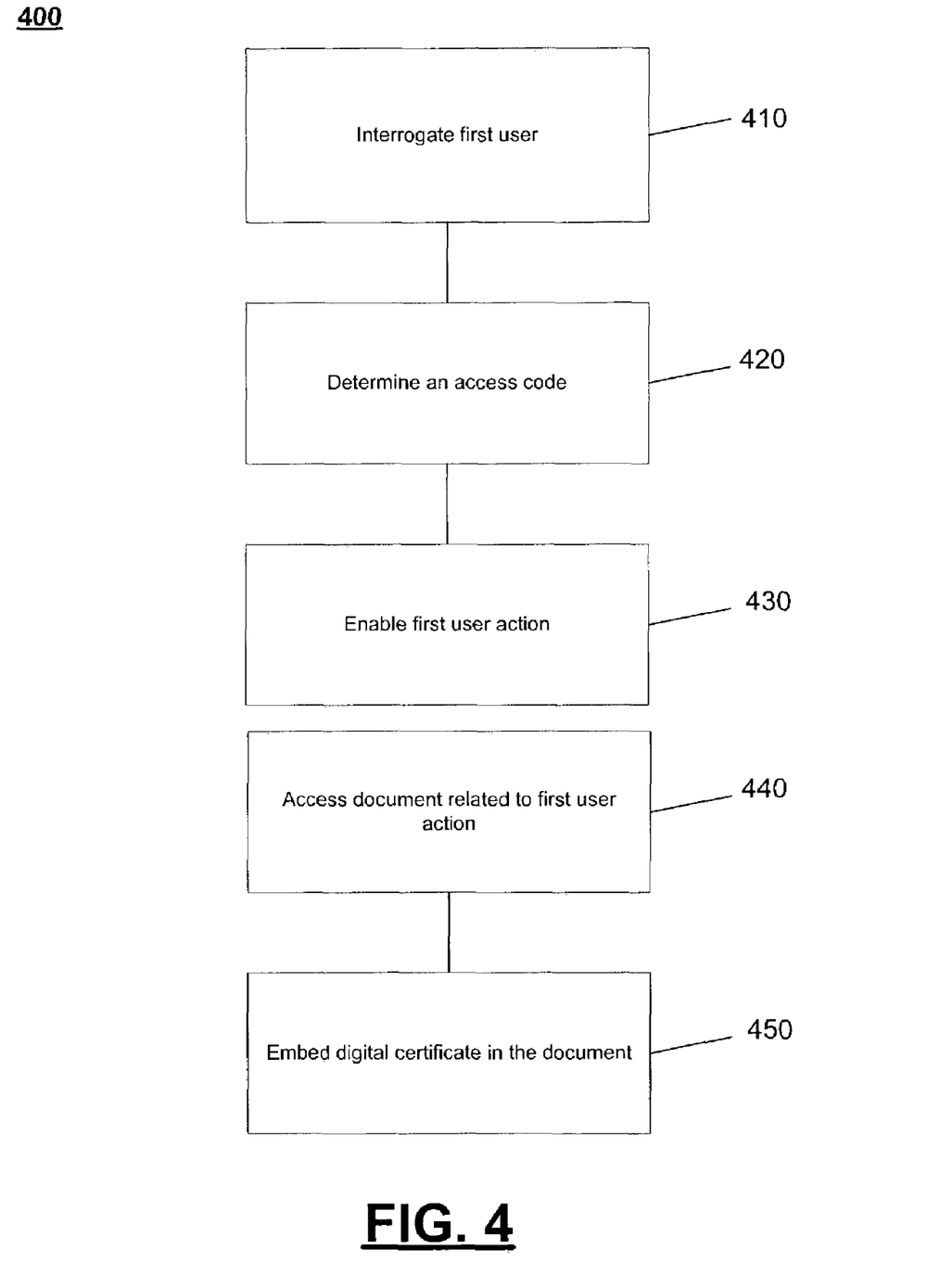
FIG. 4 is a flow chart showing how a security system may operate.

FIG. 4 illustrates a flow chart 400 showing how a security system may be administered by interrogating a first user (step 410), determining an access code (step 420), enabling a first user action (step 430), accessing a document related to the first user action (step 440), and embedding a digital certificate in the document (step 450). Generally, the operations described in flow chart 400 are described independent of the underlying environment and may be performed on the systems described previously with respect to FIGS. 1 and 3.

Thus, flow chart 400 may be implemented in environments that include, but are not limited to, physical security environments (e.g., airports, military installations), enterprise network administration, and transaction processing (e.g., electronic procurement).

Initially, a first user is interrogated by a first security system that generates a user data set based on the first user's physiological characteristics (step 410). For example, a fingerprint identification system may be used to capture a user's fingerprint information. The fingerprint identification system may be configured so that the likelihood of a user being falsely identified results in the same likelihood of a known user not being correctly identified by the fingerprint identification system.

The management station 130 determines an access code based on the user data set (step 420). Generally, the access code describes a range of one or more permissible activities. For example, the access code may describe which files a user may be allowed to access, or which areas of the airport a user is allowed to enter. In some cases, the access code may include a token that is presented when subsequently challenged. For example, a user may be initially authenticated using a fingerprint identification system. Once authenticated, the user may be given a token that is presented when the user accesses different areas. For example, the user may present the token to access a file system. The file system may allow access when the token is presented. Alternatively, the access code may include a set of permissions that are loaded into the security system that governs what the user may access.

In response, the security system enables a first user action in accordance with the access code (step 430). For example, a user may be allowed to access the user's own personal files but not be allowed to access other files.

A document related to the first user action is accessed (step 440). The document may describe the first user action directly or indirectly. A direct description would include an electronic purchase order that a user creates to purchase goods. The document may include a description of the goods, the prices, and the quantities. The user is aware of the document, and operates on the document itself. Indirect descriptions include documents that may be generated without the user appreciating that a document is being generated. One example of an indirect description would be a time stamped description stating "User A appeared in location B before camera C at time D" that is generated whenever a known user appears before a facial recognition camera. Other documents may be a hybrid of direct and indirect documents. For example, a user may present identification to enter a checkpoint. The checkpoint may capture the presented identification and also capture the user's fingerprints to enter a turnstile. This direct document may be augmented by indirect information, such as facial recognition information that is entered as the user passes through the checkpoint.

With the document accessed, a digital certificate is embedded in the document incorporating the user data set (step 450). Generally, the digital certificate includes information indicating that an action has been authenticated. The digital certificate may be used to authenticate the user and provide forensic information so that the action may not be repudiated at a later time. For example, when the user data represents a fingerprint snapshot, the snapshot may be initially authenticated with a security database. The security database then may provide a key to encrypt the user data. The user data then may be combined, encrypted, and embedded in the document to capture the user's action. Subsequent access to the document by the user or third parties also may embed certificates to securely identify who has accessed the document.

Figure 5:
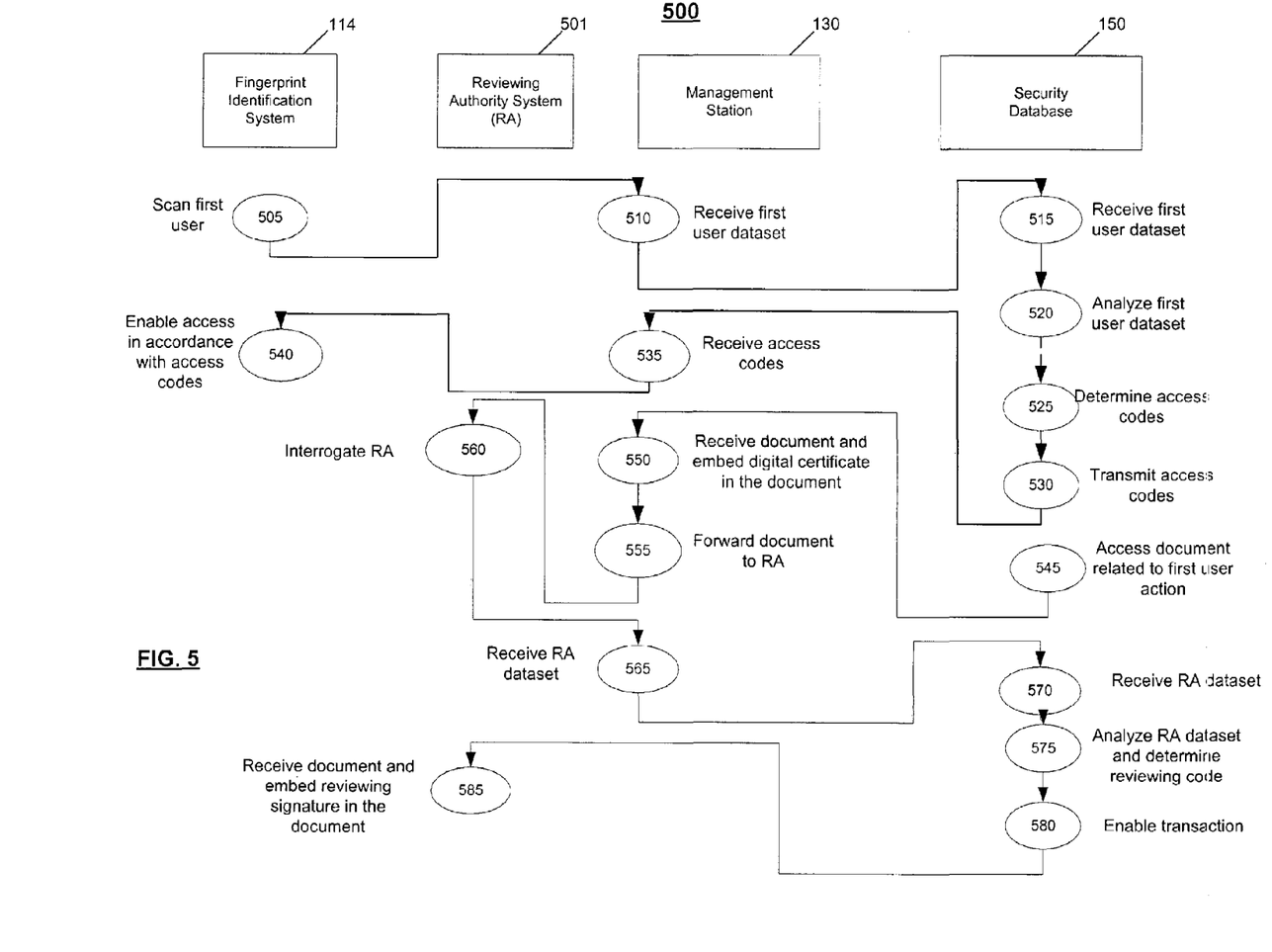
FIG. 5 is a flow chart showing how a security system may be used to support a transaction.

Referring to FIG. 5, a flow chart 500 shows the exemplary operation of a security system interfacing with a management system to authenticate user actions and securely archive which users have engaged in which activities. Generally, the systems shown in flow chart 500 have been described previously with respect to FIGS. 1 and 3. The fingerprint identification system 114 and the management station 130 have been described previously with respect to FIG. 1. The security database 150 was described previously with respect to FIGS. 1 and 3. The flow chart 500 relates to the flow chart 400 described previously with respect to FIG. 4. However, flow chart 500 illustrates how a reviewing authority may be used to execute a transaction.

Initially, the fingerprint identification system 114 scans a first user's fingerprint (step 505). For example, a customs check point may scan all inbound arrivals against a database of suspect persons. The fingerprint identification system 114 may scan in a first user's fingerprints, generate a first user dataset, and transmit the first user dataset to a management station 130 configured to manage the fingerprint identification system 114.

The management station 130 receives the first user's dataset (step 510). The management station 130 performs some processing on the first user dataset and transmits the first user dataset to the security database 150. The security database 150 receives the first user dataset (step 515).

The security database 150 then may analyze the first user dataset (step 520). Analyzing the first user dataset may determine whether there is a match between the first user dataset and information appearing within the security database. The configuration of the database may determine the nature of the analysis that is performed. For example, if the security is being performed to prevent user access to sensitive areas, the analysis may require a match between information from the first user and a database of trusted users. Alternatively, if the purpose of the analysis is to identify suspect users, a user may be allowed to proceed so long as the user's dataset does not match the dataset of a known suspect user. Thus, for example, only known violent felons may be diverted for additional screening at airports.

In response to the security operations performed by the fingerprint identification system 114, the security database 150 determines an access code (step 525). In the purchase order context, for example, the access code may indicate that the user is allowed to generate a purchase order up to a specified limit, but that a reviewing authority's approval is required. The security database 150 transmits the access code (step 530) to the management station 130, which then receives the access code (step 535). The management station 130 may use the access code to change the configuration of the security system using the fingerprint identification system 114. For example, a door may be opened to allow the user to pass. In the case of a purchase order, the user may be allowed to complete an automated form that represents a purchase order. Thus, access is enabled in accordance with the access codes (step 540).

The security system (e.g., fingerprint identification system 114) may continue operating for the user. Independently or as a result of the first user's actions, a document is accessed related to the first user action (step 545). The document may either be created or an existing document may be referenced. In the purchase order context, a document is created when the user generates a new purchase order. When the user is accessing an existing purchase order, the existing purchase order may represent an existing document that is accessed. The document need not be particular to that user. For example, an airline may maintain a passenger manifest list of all persons entering the plane. As a user is challenged upon entering the plane, the user's information may be entered into a document identifying all users that have boarded the plane.

The management station 130 receives the document (step 550). The management station 130 then embeds the first user's digital certificate in the document (step 555) and forwards the document to a reviewing authority system 501 (step 560). The reviewing authority (RA) interrogates the reviewing authority (step 560). For example, an electronic mail message may be sent to a manager that describes the proposed actions of a subordinate. The manager may be prompted to indicate approval or disapproval of the proposed action. The reviewing authority may be challenged to enter biometric information to authenticate the reviewing authority. For example, the reviewing authority's fingerprint may be entered into a fingerprint identification system after the reviewing authority indicates approval.

The fingerprint information is received by the management station (step 565). The management station transmits the reviewing data set (i.e., the reviewing authority's fingerprint) to the security database 150, which receives the RA dataset (step 570). The security database analyzes the RA data set and determines a reviewing code indicating whether the reviewing authority may approve the transaction (step 575). When the RA has validly approved the request, the transaction is enabled (step 580). Thus, a purchasing agent may receive the order and purchase the requested items. Alternative, the purchasing order may be transmitted to a supplier for fulfillment. The reviewing authority system 501 then receives the document and embeds the reviewing certificate in the document (step 585).

Other implementations are within the scope of the following claims. For example, the operations described previously may be used to ensure that at least one law enforcement authority views all suspect entrants to a secure area. All users may be asked to initially provide fingerprint information to proceed. Suspect fingerprints may be forwarded to a reviewing officer. The reviewing officer then may reference a watch list or compare the suspect with information about the suspect to determine a response. When the officer determines that the identified user is not the suspect, the officer may allow the user to proceed. However, when the identified user resembles the suspect, the identified user may be diverted for additional investigation. The officer may execute this decision by entering biometric information to complete the transaction. The officer's biometric information may be written in a certificate in a document describing users accessing the checkpoint.

The communications described previously may be used in a variety of contexts from enterprise information technology administration to law enforcement and security administration. For example, a network administrator may use one or more aspects of the communication system to allow users to access enterprise resources. Alternatively, the communications system 100 may be used to perform security screening as users pass through airports and/or other sensitive areas.

What is claimed is:

1. A method of administering a security system, the method comprising:

interrogating a first user using a first security system that generates a user data set related to at least one physiological characteristic of the first user;

determining an access code based on the user data set;

enabling a first user action in accordance with the access code;

accessing a document related to the first user action; and embedding a digital certificate in the document using the user data set.

2. The method of claim 1 further comprising forwarding a message with the document to a reviewing authority for approval.

3. The method of claim 2 further comprising interfacing with the reviewing authority to perform the following operations:

interrogating the reviewing authority using a second security system that generates a reviewing data set related to at least one physiological characteristic of the reviewing authority;

determining a reviewing code based on the reviewing data set;

enabling a transaction for the first user action when the reviewing code allows the reviewing authority to approve the transaction;

accessing the document related to the first user action; and embedding a reviewing certificate in the document using the reviewing data set.

4. The method of claim 1 wherein the first user action includes accessing a geographically-restricted area secured by the first security system.

5. The method of claim 4 wherein the document includes a manifest log recording which users have accessed the physically-restricted area.

6. The method of claim 1 wherein determining an access code includes determining that the first user has initial permission to begin preliminary activities that are part of a larger task.

7. The method of claim 6 wherein an approval of a reviewing authority is required before the larger task may be completed.

8. The method of claim 1 wherein the document separately archives the digital certificate and a description of the user action in different locations.

9. The method of claim 1 wherein the digital certificate includes the user data set.

10. The method of claim 1 wherein the digital certificate includes the result of a logical operation on the user data set.

11. The method of claim 1 wherein enabling the first user action includes providing the first user apparent access while activating an alarm.

12. The method of claim 11 further comprising tracking one or more actions of the first user.

13. The method of claim 1 further comprising embedding a later digital certificate in the document when the document is subsequently accessed.

14. The method of claim 1 wherein the user data set is related to multiple physiological characteristics of the first user and determining the access code comprises determining the access code based on a subset of the user data set corresponding to at least one particular physiological characteristic, the method further comprising varying which at least one particular physiological characteristic is used in determining the access code.

15. The method of claim 1 wherein determining the access code comprises determining whether at least a portion of the user data set corresponds to a second data set in a manner that satisfies a threshold condition.

16. The method of claim 15 further comprising modifying the threshold condition.

17. The method of claim 16 wherein modifying the threshold condition comprises doing so in response to changing security concerns.

18. The method of claim 1 wherein modifying the threshold condition comprises doing so in response to system loading conditions.

19. A security system comprising:
a first security system structured and arranged to interrogate a first user and generate a user data set related to at least one physiological characteristic of the first user; and
a first processor structured and arranged to
determine an access code based on the user data set,
enable a first user action in accordance with the access code,
access a document related to the first user action, and
embed a digital certificate in the document using the user data set.

20. The system of claim 19 wherein the first processor is structured and arranged to forward a message with the document to a reviewing authority for approval.

21. The system of claim 20 wherein the first processor is structured and arranged to perform the following operations:
interrogate the reviewing authority using a second security system that generates a reviewing data set related to at least one physiological characteristic of the reviewing authority;
determine a reviewing code based on the reviewing data set;
enable a transaction for the first user action when the reviewing code allows the reviewing authority to approve the transaction;
access the document related to the first user action; and
embed a reviewing certificate in the document using the reviewing data set.

22. The system of claim 19 wherein the first user action includes accessing a geographically-restricted area secured by the first security system.

23. The system of claim 22 wherein the document includes a manifest log recording which users have accessed the physically-restricted area.

24. The system of claim 19 wherein the first processor is structured and arranged to determine an access code includes determine that the first user has initial permission to begin preliminary activities that are part of a larger task.

25. The system of claim 24 wherein the first processor is structured and arranged to require an approval from a reviewing authority before the larger task may be completed.

26. The system of claim 19 further comprising storage structured and arranged to separately store the digital certificate and a description of the related action.

27. The system of claim 19 wherein the digital certificate includes the user data set.

28. The system of claim 19 wherein the digital certificate includes the result of a logical operation on the user data set.

29. The system of claim 19 wherein the first processor is structured and arranged to provide the first user apparent access while activating an alarm.

30. The system of claim 29 wherein the first processor is structured and arranged to track one or more actions of the first user.

31. The system of claim 19 wherein the first processor embeds a certificate in the document when the document is subsequently accessed.

32. The system of claim 19 wherein the user data set is related to multiple physiological characteristics of the first user and the first processor is structured and arranged to:
determine the access code based on a subset of the user data set corresponding to at least one particular physiological characteristic, and
vary which at least one particular physiological characteristic is used to determine the access code.

33. The system of claim 19 wherein the first processor is structured and arranged to determine the access code by determining whether correspondence of at least a portion of the user data set to a second data set satisfies a threshold condition.

34. The system of claim 33 wherein the first processor is structured and arranged to modify the threshold condition.

35. The system of claim 34 wherein the first processor is structured to modify the threshold condition in response to security concerns.

36. The system of claim 34 wherein the first processor is structured and arranged to modify the threshold condition in response to system loading conditions.

37. A computer-readable storage medium storing a security program for controlling a computer, the security program comprising:
a first security code segment structured and arranged to interrogate a first user and generate a user data set related to at least one physiological characteristic of the first user;
a first code segment structured and arranged to determine an access code based on the user data set;
a second code segment structured and arranged to enable a first user action in accordance with the access code;
a document code segment structured and arranged to access a document related to the first user action; and
a certificate code segment structured and arranged to embed a digital certificate in the document using the user data set.

38. A security system comprising:
means for interrogating a first user using a first security system that generates a user data set related to at least one physiological characteristic of the first user;
means for determining an access code based on the user data set;
means for enabling a first user action in accordance with the access code;
means for accessing a document related to the first user action; and
means for embedding a digital certificate in the document using the user data set.

* * * * *